(12) United States Patent
Park et al.

(10) Patent No.: US 8,675,975 B2
(45) Date of Patent: Mar. 18, 2014

(54) METHOD FOR ENCODING IMAGE USING ESTIMATION OF COLOR SPACE

(75) Inventors: Ji Ho Park, Seoul (KR); Je Woo Kim, Seongnam-Si (KR); Byeng Ho Choi, Yongin-Si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 1090 days.

(21) Appl. No.: 12/691,824

(22) Filed: Jan. 22, 2010

(65) Prior Publication Data

US 2011/0158521 A1    Jun. 30, 2011

(30) Foreign Application Priority Data

Dec. 31, 2009  (KR) .................. 10-2009-0135324

(51) Int. Cl.
*G06K 9/36*    (2006.01)
(52) U.S. Cl.
USPC .............. 382/232; 341/76; 345/591; 358/1.1; 382/162; 382/254; 382/260; 382/268
(58) Field of Classification Search
None
See application file for complete search history.

(56) References Cited

U.S. PATENT DOCUMENTS

| 5,384,901 | A | * | 1/1995 | Glassner et al. ............... 345/591 |
| 5,680,129 | A | | 10/1997 | Weinberger et al. ............ 341/65 |
| 6,021,227 | A | | 2/2000 | Sapiro et al. ................... 382/239 |
| 6,396,422 | B1 | * | 5/2002 | Barkan ............................ 341/76 |
| 6,636,645 | B1 | * | 10/2003 | Yu et al. ......................... 382/268 |
| 7,555,159 | B2 | * | 6/2009 | Pishva ........................... 382/162 |
| 2004/0169872 | A1 | * | 9/2004 | Maurer .......................... 358/1.9 |
| 2004/0208359 | A1 | * | 10/2004 | Pishva ........................... 382/162 |
| 2005/0152612 | A1 | * | 7/2005 | Spaulding et al. ............. 382/254 |
| 2006/0034539 | A1 | * | 2/2006 | Nachlieli et al. .............. 382/260 |
| 2006/0061777 | A1 | * | 3/2006 | Duggan et al. ................. 358/1.1 |

* cited by examiner

*Primary Examiner* — Tsung-Yin Tsai
(74) *Attorney, Agent, or Firm* — Sughrue Mion, PLLC

(57) ABSTRACT

An image encoding method using color space estimation is provided. A method for encoding a second color space pixel corresponding to coordinates of a first color space pixel using color spaces, includes encoding a pixel of a first color space; calculating a color space estimation value of a current pixel of a second color space by referring to the encoded pixel of the first color space; and encoding a differential value of the calculated color space estimation value and the current pixel value. Thus, the image compression efficiency can be enhanced by using the information between the color spaces in the image encoding, and the lossless image compression can be accomplished by ruling out the similarity of the pixels.

5 Claims, 6 Drawing Sheets

METHOD FOR ENCODING IMAGE USING ESTIMATION OF COLOR SPACE

PRIORITY

This application claims the benefit under 35 U.S.C. §119 (a) to a Korean patent application filed in the Korean Intellectual Property Office on Dec. 31, 2009 assigned Serial No. 10-2009-0135324, the entire disclosure of which is hereby incorporated by reference.

BACKGROUND OF THE INVENTION

1. Field of the Invention

The present invention relates generally to a method for encoding an image using color space estimation. More particularly, the present invention relates to an image encoding method using the color space estimation, which can compress the image without loss by ruling out similarity between pixels.

2. Description of the Related Art

Video encoding includes a lossy compression scheme and a lossless compression scheme. To compress the video without loss, it is general to entropy-encode an error signal which is a difference between an estimated block according to an estimation result and a current block, rather than applying Discrete Cosine Transform (DCT) or quantization.

The conventional lossless compression scheme uses the pixel based compression. Given that a pixel to currently encode or decode is $Ix$, a pixel on the left is Ra, a pixel above Ix is Rb, a top-left pixel is Rc, and a top-right pixel is Rd, the encoding is performed using the relation between the neighbor pixels and the current pixel. When all of the neighbor pixel values are the same, the conventional lossless compression scheme operates in a Run mode. When the neighbor pixel values are inconsistent, the conventional lossless compression method operates in a Regular mode.

In the Run mode, when the number of fixed-length Runs is repeated, the method encodes/decodes a bit indicative of the occurrence of the Runs as many as the fixed length and then checks whether the Run is continued. When all of the neighbor pixel values do not match, the inconsistent pixel value is encoded. In so doing, the encoding method is similar to the Regular mode.

In the Regular mode, the encoding is performed using how different the neighbor pixel values are. First, difference values of the neighbor pixel values are calculated. Three difference values of $D1=Rd-Rb$, $D2=Rb-Rc$, and $D3=Rc-Ra$ are used, and the acquired D1, D2 and D3 are quantized using a particular threshold. The quantization value has 9 cases ranging $-3\sim3$. D1, D2 and D3 each have $9\times9\times9$ cases. However, since both of the negative number and the positive number are used as the same value, the number of cases is reduced by half. Accordingly, the encoding varies according to 365 cases.

When a most similar value to the current pixel is set to an estimation value Px, Px can be calculated as follows:

```
if (Rc >= max(Ra, Rb))
Px = min(Ra, Rb);
else {
If (Rc <= min(Ra, Rb))
Px = max(Ra, Rb);
else
Px = Ra + Rb - Rc;
}
```

The encoded or decoded value is a differential value from the difference between the calculated estimation value Px and the current(Ix) pixel value. The differential value can be a negative number. To make it to a positive number, a particular value is added. For example, as for a 8-bit depth value, 256 is added to modify the range of the differential value to 0~255.

Next, this value is modified into the normal range. As for the value more than half of the entire displacement; that is, as for 8 bits, the value greater than 128 is added with $-128$ and its displacement is modified to $-128\sim127$. The substantial bit sequence coding adopts a limited golomb code.

The conventional lossless compression method as discussed above encodes or decodes using only the neighbor pixel values, and the value used to encode/decode the current pixel is only 4 neighbor pixel values. Thus, a new method for raising the encoding and decoding efficiency is demanded.

SUMMARY OF THE INVENTION

An aspect of the present invention is to address at least the above mentioned problems and/or disadvantages and to provide at least the advantages described below. Accordingly, an aspect of the present invention is to provide an image encoding method using color space estimation, which encodes a current pixel by referring to a previously encoded pixel of the color space.

Another aspect of the present invention is to provide an image encoding method using color space estimation, which encodes a current pixel by combining a color space estimation value and a space estimation value with an adequate weight.

Yet another aspect of the present invention is to provide an image encoding method using color space estimation, which encodes an image by properly mixing a color space estimation method and a space estimation method and selecting an efficient compression method.

According to one aspect of the present invention, a method for encoding an image using color space estimation, which encodes a second color space pixel corresponding to coordinates of a first color space pixel using color spaces, includes encoding a pixel of a first color space; calculating a color space estimation value of a current pixel of a second color space by referring to the encoded pixel of the first color space; and encoding a differential value of the calculated color space estimation value and the current pixel value.

The calculating of the color space estimation value may include calculating a differential value of a horizontal neighbor pixel value of a first color space corresponding pixel corresponding to the current pixel, and the first color space corresponding pixel value; calculating a differential value of a vertical neighbor pixel value of the first color space corresponding pixel corresponding to the current pixel, and the first color space corresponding pixel value; multiplying a lowest differential value of the calculated differential values by a weight; and adding a pixel value of the second color space corresponding to a neighbor pixel of the first color space producing the lowest differential value, and the result of the multiplication.

The weight may be a differential value between every pixel value of the first color space and every pixel value of the second color space.

The weight may be a differential value between a pixel value in a certain size of the first color space and a pixel value in a certain size of the second color space.

The weight may be calculated using a Mean Square Error (MSE) scheme.

When the weight is 1, the method may further include calculating an absolute value of the vertical differential value;

calculating an absolute value of the horizontal differential value; calculating a differential value of the absolute value of the vertical differential value and the absolute value of the horizontal differential value; determining similarity of the current pixel in a horizontal direction or in a vertical direction by comparing the absolute differential value with a threshold; and calculating the estimation value according to a result of the determination.

When the absolute differential value is greater than a positive threshold, the method may include determining that the current pixel is similar in the horizontal direction; and calculating addition of the horizontal differential value and horizontal neighbor pixel values of the current pixel as an estimation value of the current pixel.

The positive threshold may be 10.

When the absolute differential value is greater than a negative threshold, the method may include determining that the current pixel is similar in the vertical direction; and calculating addition of the vertical differential value and vertical neighbor pixel values of the current pixel as an estimation value of the current pixel.

The negative threshold may be −10.

When the absolute differential value is greater than a positive threshold and less than a negative threshold, the method may include determining that the current pixel is similar in the horizontal direction and the vertical direction; and calculating an estimation value of the current pixel by adding the horizontal differential value, the vertical differential value, the horizontal neighbor pixel values of the current pixel, and the vertical neighbor pixel values of the current pixel and dividing the result of the addition by 2. The positive threshold is may be 10 and the negative threshold may be −10.

According to another aspect of the present invention, a method for encoding an image using color space estimation, which encodes a second color space pixel corresponding to coordinates of a first color space pixel using color spaces, includes encoding a pixel of a first color space; calculating a color space estimation value of a current pixel of a second color space by referring to the encoded pixel of the first color space; calculating a space estimation value using a differential value of the current pixel value and neighbor pixel values of the current pixel; calculating an estimation value of the current pixel using the color space estimation value, the space estimation value, and a complexity coefficient of the neighbor pixels of the current pixel; and encoding a differential value of the calculated estimation value and the current pixel value.

The estimation value may be calculated based on the following equation:

$$Fx=(a)Pix+(1-a)Px$$

where Fx denotes the estimation value, a denotes the complexity coefficient of the neighbor pixels of the current pixel, Pix denotes the color space estimation value, and Px denotes the space estimation value.

The complex coefficient of the neighbor pixels can range from 0.65 to 0.70.

According to yet another aspect of the present invention, a method for encoding an image using color space estimation, which encodes a second color space pixel corresponding to coordinates of a first color space pixel using color spaces, includes encoding a pixel of a first color space; calculating a color space estimation value of a current pixel of a second color space by referring to the encoded pixel of the first color space; calculating a space estimation value using a differential value of the current pixel value and neighbor pixel values of the current pixel; scaling a correlation value of the first color space and the second color space with a scale factor; calculating an estimation value of the current pixel according to the calculated correlation value; and encoding a differential value of the calculated estimation value and the current pixel value.

When the scaled correlation value is greater than a first threshold, the calculating of the estimation value may select the color space estimation value as an estimation value of the current pixel.

When the scaled correlation value is less than a second threshold, the calculating of the estimation value may select the space estimation value as an estimation value of the current pixel.

The calculating of the estimation value may include when the scaled correlation value is greater than a second threshold and less than a first threshold, calculating an estimation value of the current pixel using the color space estimation value, the space estimation value, and a complexity coefficient of the neighbor pixels of the current pixel.

According to still another aspect of the present invention, a recording medium readable by a computer stores a computer program to execute an image encoding method using color space estimation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
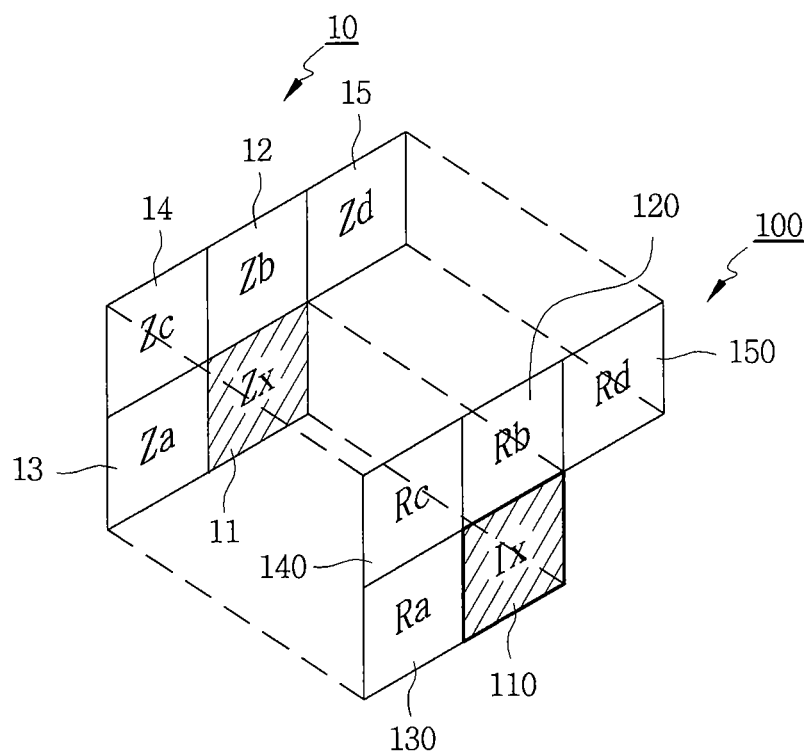
FIG. 1 is a diagram of a color space used in an image encoding method using color space estimation according to an exemplary embodiment of the present invention.

FIG. 1 is a diagram of a color space used in an image encoding method using color space estimation according to an exemplary embodiment of the present invention.

Referring to FIG. 1, an input video signal uses various color spaces to rule out mutual redundancy. Three color spaces can be employed. YUV or RGB are representative examples. The present invention is not limited to one color space and utilizes a plurality of different color spaces. When the plurality of the color spaces is used, the color space encoded or decoded first is referred to as a first color space 10 and the color space encoded or decoded using an image encoding method based on the color space estimation according to an exemplary embodiment of the present invention is referred to as a second color space 100. In this exemplary embodiment, the second color space 100 makes use of the pre-encoded first color space 10.

For example, when the input video signal is encoded using the color space, it can be encoded in the order of GBR. The G color space corresponds to the first color space 10 and the B color space corresponds to the second color space 100. The signal of the G color space is encoded using the conventional encoding method. Next, to encode the signal of the B color space, the pre-encoded G color space can be referred to.

The B color space 100 includes a current pixel Ix 110 to encode, and neighbor pixels Ra 130, Rb 120, Rc 140, and Rd 150 of the Ix 110, which are the same color space signals as the current pixel Ix 110. The G color space 10 lies in coordinates corresponding to the current pixel Ix 110 and includes Za 13, Zb 12, Zc 14, and Zd 15 pre-encoded. The B color space 100 and the G color space 10; that is, the second color space 100 and the first color space 10 include the pixels of which the coordinates correspond with each other.

Figure 2:
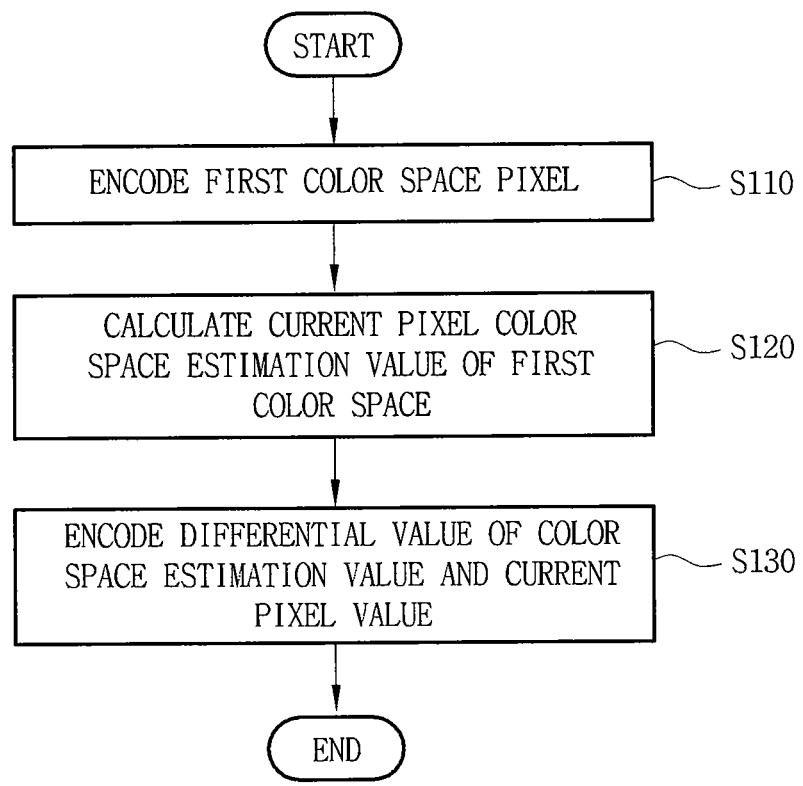
FIG. 2 is a flowchart of the image encoding method using the color space estimation according to an exemplary embodiment of the present invention.

FIG. 2 is a flowchart of the image encoding method using the color space estimation according to an exemplary embodiment of the present invention. Referring to FIG. 2, the image encoding method using the color space estimation according to an exemplary embodiment of the present invention first encodes the pixel of the first color space (S110). The first color space can be encoded using the conventional image encoding method. To encode the signal of the next color space; that is, to encode the signal of the second color space, an estimation value of the current pixel in the second color space is calculated by referring to the pre-encoded pixel of the second color space (S120). When the color space estimation value is calculated, a difference value between the calculated color space estimation value and the current pixel value is encoded (S130). The color space estimation can calculate the estimation value from the pixel values of the color space including the current pixel to currently encode and the other color space. That is, the color space estimation calculates the estimation value using Za 13, Zb 12, Zc 14 and Zd 15 of FIG. 1.

Figure 3:
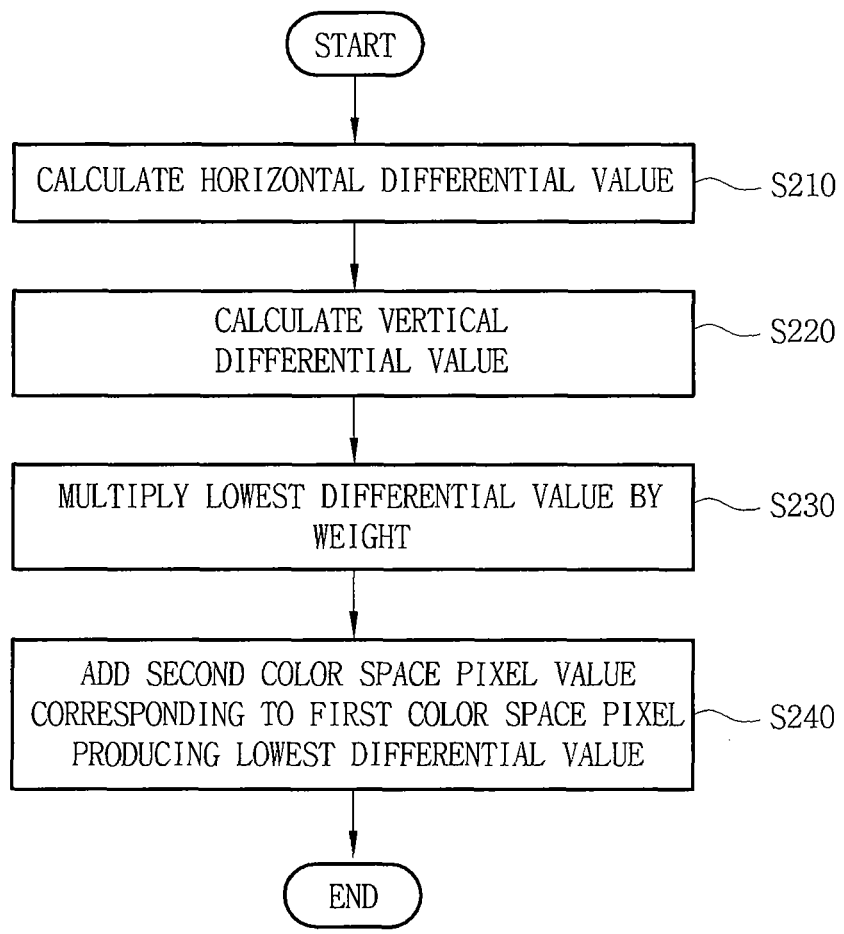
FIG. 3 is a flowchart of a color space estimation value calculating method according to an exemplary embodiment of the present invention.

FIG. 3 is a flowchart of a color space estimation value calculating method according to an exemplary embodiment of the present invention.

Referring to FIGS. 1 and 3, the color space estimation value of the present invention calculates a differential value between a horizontal neighbor pixel value 13 of the first color space corresponding pixel 11 corresponding to the current pixel Ix 110 of the second color space 100, and the first color space corresponding pixel value 111 (S210). The differential value Za−Zx is referred to as a horizontal differential value.

In the same manner, a vertical differential value Zb−Zx is calculated (S220). That is, the differential value between the vertical neighbor pixel value 12 of the first color space corresponding pixel 11 corresponding to the current pixel Ix 110 of the second color space 100, and the first color space corresponding pixel value 11 is calculated (S220). The lowest differential value of the horizontal differential value and the vertical differential value calculated is multiplied by a weight (S230). The weight shall be described later. The pixel value of the second color space corresponding to the neighbor pixel of the first color space which produces the lowest differential value is added with the result of the multiplication (S240). Its result is calculated as the color space estimation value.

For example, the horizontal differential value Za−Zx is smaller than the vertical differential value Zb−Zx, the neighbor pixel of the second color space which yields the lowest differential value is Ra 130 and the color space estimation value of the current pixel Ix 110 is calculated as Weight×(Za−Zx)+Ra. That is, the great difference of the pixel values is determined as the considerable boundary between the pixels and the reference in the corresponding direction is limited. For example, when the edge exists in the horizontal direction, the color space estimation value of the current pixel Ix 110 is Weight×(Za−Zx)+Ra. When the edge is detected in the vertical direction, the color space estimation value of the current pixel Ix 110 is Weight×(Zb−Zx)+Rb.

In this exemplary embodiment of the present invention, the weight can be used as the weight for the difference value between the color spaces in a certain region. For example, the differential value between every pixel value of the first color space 10 and every pixel value of the second color space 100 can be used as the weight. Also, the differential value between the pixel value in a certain size of the first color space 10 and the pixel value in a certain size of the second color space 100 can be used as the weight. The weight may be acquired using a Mean Square Error (MSE) scheme using four neighbor pixels Ra, Rb, Rc and Rd around the current pixel Ix 110. In the color space estimation value calculating method as stated earlier, the weight can be fixed to 1. The color space estimation value calculating method when the weight is 1 is explained in FIG. 4.

Figure 4:
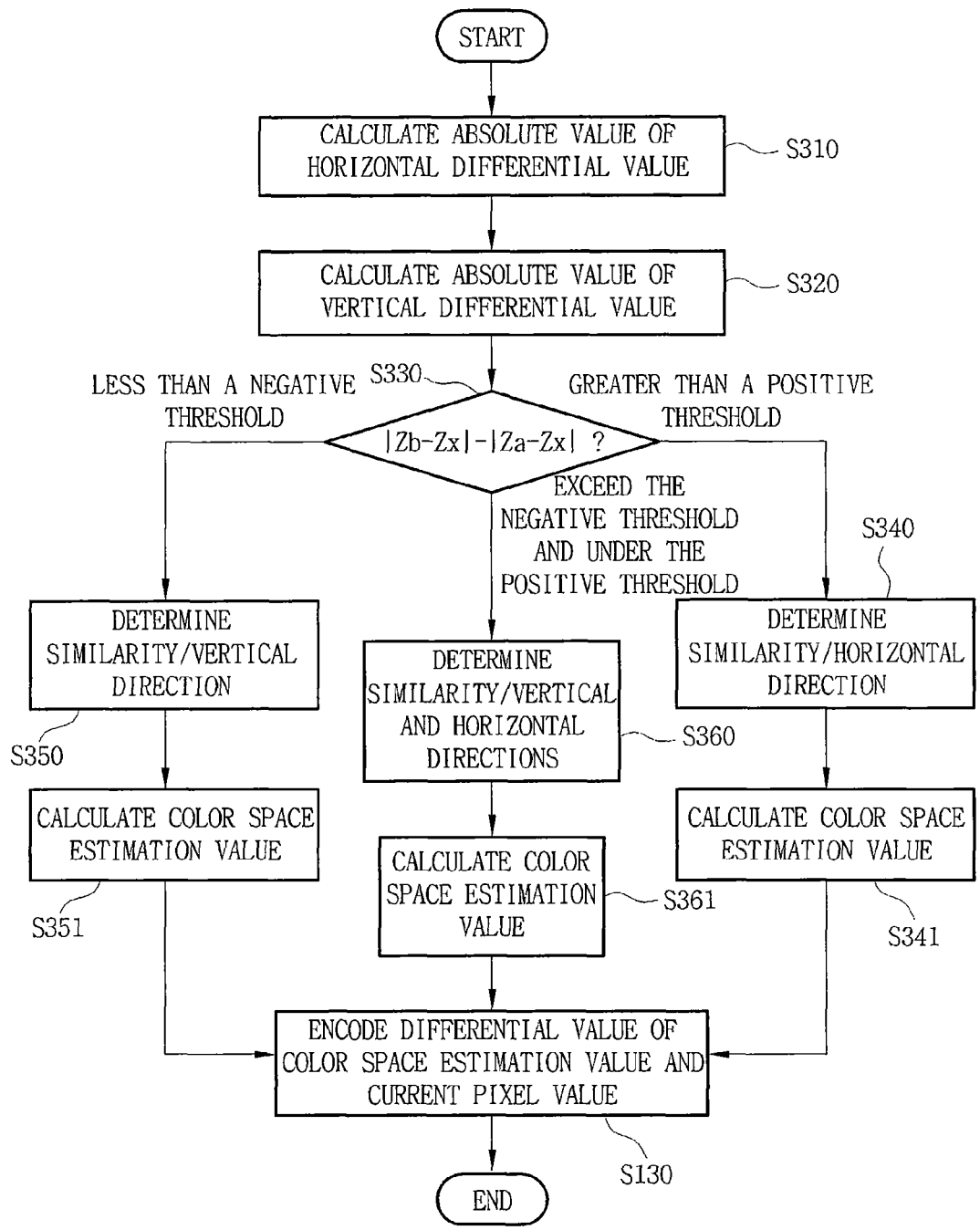
FIG. 4 is a flowchart of the color space estimation value calculating method when a weight is 1 according to an exemplary embodiment of the present invention.

FIG. 4 is a flowchart of the color space estimation value calculating method when the weight is 1 according to an exemplary embodiment of the present invention. When the weight is fixed to 1, the color space estimation value varies according to the difference value between Zx, Za and Zb.

In FIG. 4, to compare |Zx−Zb|−|Zx−Za| value with a certain threshold, the absolute value |Zx−Za| of the horizontal differential value is calculated (S310) and the absolute value |Zx−Zb| of the vertical differential value is calculated (S320).

When the differential value =Zx−Zb|−|Zx−Za| of the absolute value of the vertical differential value and the absolute value of the horizontal differential value is greater than positive threshold (e.g., 10), it is determined that the current pixel has the greater similarity in the horizontal direction (S340) and the color space estimation value of the current pixel is Ra+(Zx−Za) (S341).

When the differential value |Zx−Zb|−|Zx−Za| of the absolute values is less than a negative threshold (e.g., −10), it is determined that the current pixel has the greater similarity in the vertical direction (S350) and the color space estimation value of the current pixel is Rb+(Zx−Zb) (S351).

When the differential value |Zx−Zb|−|Zx−Za| of the absolute values does not correspond to those two conditions; that is, when the differential value is under the positive threshold (e.g., 10) and exceed the negative threshold (e.g., −10), it is determined that the current pixel has the great similarity in either direction (horizontal direction and vertical direction) (S360). The color space estimation value of the current pixel is acquired by adding the horizontal differential value, the vertical differential value, the horizontal neighbor pixel value of the current pixel, and the vertical neighbor pixel value of the current pixel and dividing the result of the addition by 2. Namely, the color space estimation value is {Ra+Rb+(2*Zx−Za−Zb)}/2 (S361).

Figure 5:
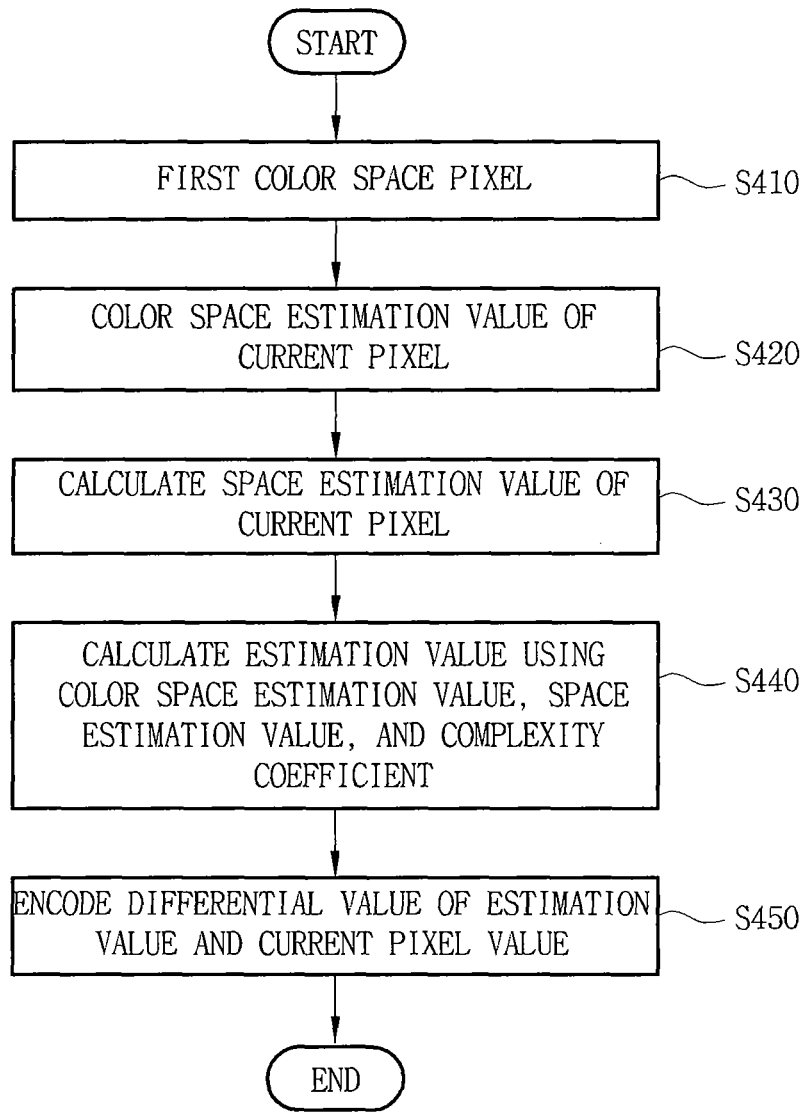
FIG. 5 is a flowchart of an image encoding method using the color space estimation according to another exemplary embodiment of the present invention.

In FIGS. 3 and 4, the lossless image compression method using the color space by calculating the color space estimation value of the current pixel to encode has been described. That is, the estimation value of the current pixel is used as the color space estimation value. In FIG. 5 a new estimation value is calculated by combining the space estimation value with the color space estimation value using an adequate weight, and executes the lossless image compression. In FIGS. 3 and 4 the color space estimation value alone used as the estimation value. FIG. 5 is a flowchart of an image encoding method using the color space estimation according to another exemplary embodiment of the present invention.

In FIG. 5, the pixel of the first color space is encoded as described in FIGS. 3 and 4 (S410), and the color space estimation value of the current pixel of the second color space is calculated by referring to the encoded pixel of the first color space (S420). S410 and S420 are the same as in the exemplary embodiment. The calculated color space estimation value is referred to as Pix.

To calculate the space estimation value besides the color space estimation value, the space estimation value uses the pixel values of the pixels (see FIG. 1) of the second color space 100 of FIG. 1. The space estimation value is calculated using the differential value of the current pixel value and the neighbor pixel value of the current pixel (S430). The calculated space estimation value is Px.

The estimation value of the current pixel is calculated using the color space estimation value Pix, the space estimation value Px, and a complexity coefficient a of the neighbor pixels of the current pixel (S440). The estimation value can be given by the following equation.

$$Fx=(a)Pix+(1-a)Px \quad (1)$$

In the equation, Fx denotes the estimation value, a denotes the complexity coefficient of the neighbor pixels of the current pixel, Pix denotes the color space estimation value, and Px denotes the space estimation value.

The complexity of the chrominance component image block can be computed using various algorithms. For instance, the complexity can be calculated by detecting the edge in the block using a canny edge detection algorithm or a sobel edge detection algorithm and computing the amount of the detected edge. Alternatively, the complexity can be acquired by adding gradient values of the pixels in the chrominance component image block. The complexity coefficient ranges 0.65~0.70.

When the estimation value is calculated, the differential value of the calculated estimation value and the current pixel value is encoded (S450).

Figure 6:
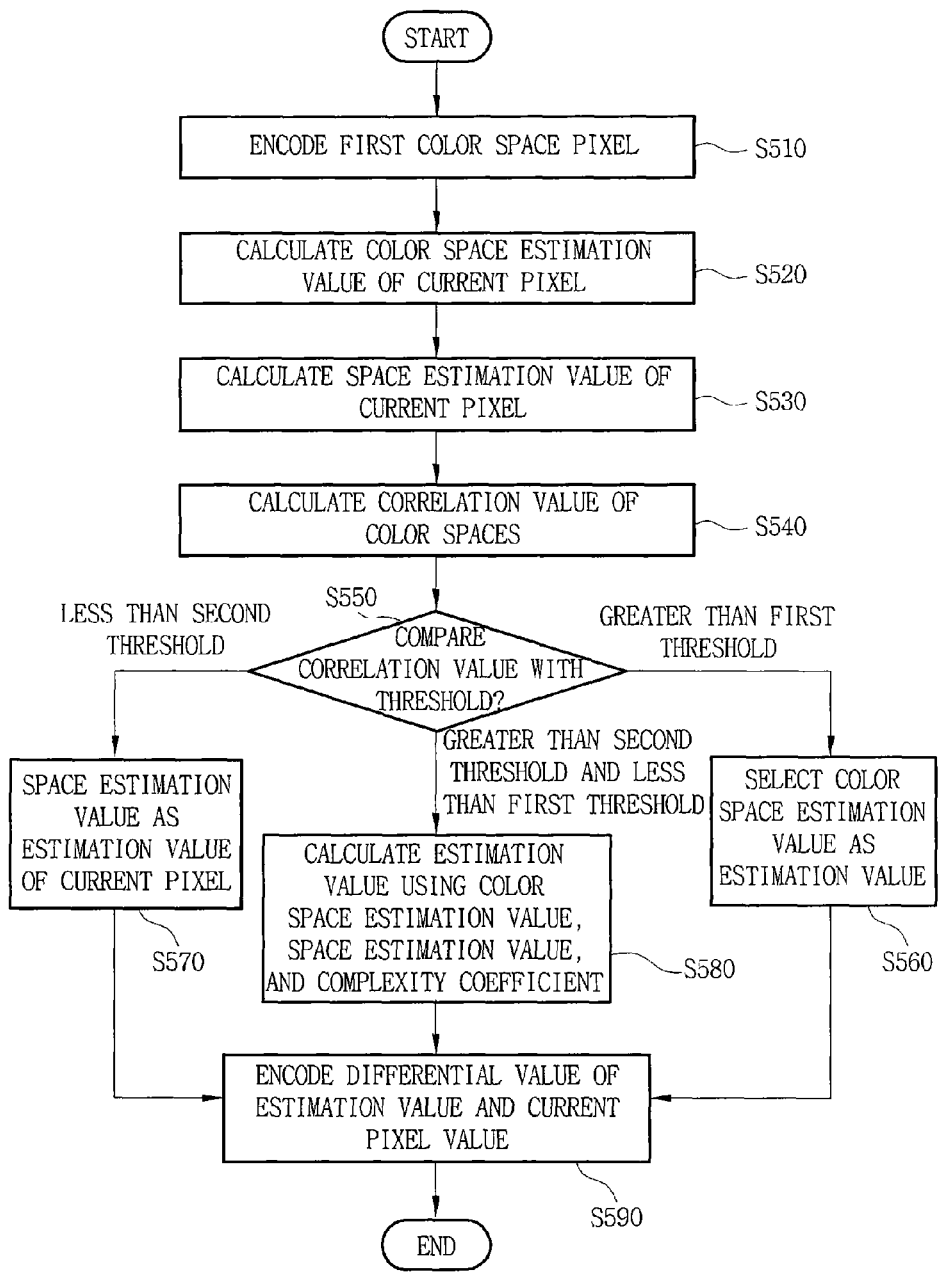
FIG. 6 is a flowchart of an image encoding method using the color space estimation according to yet another exemplary embodiment of the present invention.

FIG. 6 is a flowchart of an image encoding method using the color space estimation according to yet another exemplary embodiment of the present invention.

In FIG. 6, the pixel of the first color space is encoded (S510), the color space estimation value of the current pixel of the second color space is calculated by referring to the encoded pixel of the first color space (S520), and the space estimation value is calculated using the differential value of the current pixel value and the neighbor pixel values of the current pixel (S530) as stated earlier.

In this yet another embodiment, a correlation value C is calculated from neighbor pixels of two or more color spaces using a correlation function, and a scaled correlation value C×f is calculated by scaling the correlation value with a scale factor f (S540). The scale factor f indicates characteristics (e.g., resolution of the image) to encode and can vary according to the characteristics of the image. The scaled correlation value is compared with a threshold and thus a new estimation value is calculated.

In other words, the estimation value can vary according to the scaled correlation value. For example, the estimation value can be the color space estimation value or the space estimation value. The estimation value can be acquired by properly combining the color space estimation value and the space estimation value using the aforementioned complexity coefficient.

When the scaled correlation value is greater than a first threshold, the color space estimation value is set to the estimation value of the current pixel (S560). When the scaled correlation value is less than a second threshold, the space estimation value is set to the estimation value of the current pixel (S570). When the scaled correlation value is greater than the second threshold and less than the first threshold, the estimation value of the current pixel can be calculated using the color space estimation value, the space estimation value, and the complexity coefficient of the neighbor pixels of the current pixel.

Meanwhile, when the color space estimation scheme or the space estimation scheme is properly mixed, different contexts can be used. The difference values of Rc−Pix, Rb−Pix, and Ra−Pix (see FIG. 1) are quantized up to the values −3~3. By using the negative number and the positive number in the same context with the quantized value, 365 contexts in total can be used in addition.

In this new contexts obtained by applying the color space estimation scheme, the value 0 is distributed in the greatest number. Due to the uniform distribution, separate re-modification is unnecessary.

It is apparent that the image encoding method using the color space estimation of the present invention can be applied to the image decoding method using the color space estimation.

Herein, the image covers all of still images and videos.

The present invention can be implemented using a recording medium readable by a computer containing a computer program for encoding the pixel of the first color space, calculating the color space estimation value to calculate the estimation value of the current pixel of the second color space by referring to the encoded pixel of the first color space, and encoding the differential value of the calculated estimation value and the current pixel value.

The present invention can be implemented using a recording medium readable by a computer containing a computer program for encoding the pixel of the first color space, calculating the color space estimation value of the current pixel of the second color space by referring to the encoded pixel of the first color space, calculating the space estimation value using the differential value of the current pixel value and the neighbor pixel values of the current pixel, calculating the estimation value of the current pixel using the color space estimation value, the space estimation value, and the complexity coefficient of the neighbor pixels of the current pixel, and encoding the differential value of the calculated estimation value and the current pixel value.

The present invention can be implemented using a recording medium readable by a computer containing a computer program for encoding the pixel of the first color space, calculating the color space estimation value of the current pixel of the second color space by referring to the encoded pixel of the first color space, calculating the space estimation value using the differential value of the current pixel value and the neighbor pixel values of the current pixel, calculating the correlation value of the first color space and the second color space, calculating the estimation value of the current pixel according to the calculated correlation value, and encoding the differential value of the calculated estimation value and the current pixel value.

According to the present invention, the image compression efficiency can be raised using the information between the color spaces.

While the pixels of the first color space are encoded and decoded in the same manner as the conventional method, the subsequent pixels of the second color space can use the value of the first color space for their encoding. Thus, the image compression efficiency can be raised.

The method of the higher compression efficiency can be selected from the space estimation method and the color space estimation method.

By calculating the adequate ratio between the space estimation value and the color space estimation value and mixing the space estimation value and the color space estimation value, the image compression efficiency can be enhanced.

The lossless image compression can be achieved by ruling out the similarity of the pixels at maximum.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for encoding an image using color space estimation, the method encoding a second color space pixel corresponding to coordinates of a first color space pixel using color spaces, comprising:
   encoding a pixel of a first color space;
   calculating a color space estimation value of a current pixel of a second color space by referring to the encoded pixel of the first color space;
   calculating a space estimation value using a differential value of the current pixel value and neighbor pixel values of the current pixel;
   scaling a correlation value of the first color space and the second color space with a scale factor;
   calculating an estimation value of the current pixel according to the calculated correlation value; and
   encoding a differential value of the calculated estimation value and the current pixel value,
   wherein the calculating of the color space estimation value comprises:
   calculating a differential value of a horizontal neighbor pixel value of the first color space corresponding pixel corresponding to the current pixel, and the first color space corresponding pixel value;
   calculating a differential value of a vertical neighbor pixel value of the first color space corresponding pixel corresponding to the current pixel, and the first color space corresponding pixel value;
   multiplying a lowest differential value of the calculated differential values by a weight; and
   adding a pixel value of the second color space corresponding to a neighbor pixel of the first color space producing the lowest differential value, and the result of the multiplication.

2. The method of claim 1, further comprising, when the weight is 1:
   calculating an absolute value of the vertical differential value;
   calculating an absolute value of the horizontal differential value;
   calculating a differential value of the absolute value of the vertical differential value and the absolute value of the horizontal differential value;
   determining similarity of the current pixel in a horizontal direction or in a vertical direction by comparing the absolute differential value with a threshold; and
   calculating the estimation value according to a result of the determination.

3. The method of claim 2, further comprising, when the absolute differential value is greater than a positive threshold:
   determining that the current pixel is similar in the horizontal direction; and
   calculating addition of the horizontal differential value and horizontal neighbor pixel values of the current pixel as an estimation value of the current pixel.

4. The method of claim 2, further comprising, when the absolute differential value is greater than a negative threshold:
   determining that the current pixel is similar in the vertical direction; and
   calculating addition of the vertical differential value and vertical neighbor pixel values of the current pixel as an estimation value of the current pixel.

5. The method of claim 2, further comprising, when the absolute differential value is greater than a positive threshold and less than a negative threshold:
   determining that the current pixel is similar in the horizontal direction and the vertical direction; and
   calculating an estimation value of the current pixel by adding the horizontal differential value, the vertical differential value, the horizontal neighbor pixel values of the current pixel, and the vertical neighbor pixel values of the current pixel, and dividing the result of the addition by 2.

* * * * *